(12) United States Patent
Konuma (10) Patent No.: US 12,242,144 B2
(45) Date of Patent: Mar. 4, 2025

(54) DISPLAY DEVICE

(71) Applicant: ALPS ALPINE CO., LTD., Tokyo (JP)

(72) Inventor: Kengo Konuma, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/601,702

(22) Filed: Mar. 11, 2024

(65) Prior Publication Data

US 2024/0310666 A1 Sep. 19, 2024

(30) Foreign Application Priority Data

Mar. 16, 2023 (JP) ................. 2023-041638

(51) Int. Cl.
| | | |
|---|---|---|
| G02F 1/133 | (2006.01) | |
| G02F 1/1333 | (2006.01) | |
| G02F 1/1345 | (2006.01) | |
| G02F 1/1368 | (2006.01) | |
| G06F 3/041 | (2006.01) | |

(52) U.S. Cl.
CPC ...... *G02F 1/13306* (2013.01); *G02F 1/13338* (2013.01); *G02F 1/13452* (2013.01); *G02F 1/1368* (2013.01); *G06F 3/0412* (2013.01); G06F 3/04166 (2019.05)

(58) Field of Classification Search
None
See application file for complete search history.

(56) References Cited

U.S. PATENT DOCUMENTS

| | | |
|---|---|---|
| 9,024,913 B1 | 5/2015 | Jung et al. |
| 2002/0135312 A1* | 9/2002 | Koyama ............. G09G 3/3275 |
| | | 315/169.3 |
| 2007/0296683 A1* | 12/2007 | Orisaka ................. G02F 1/1345 |
| | | 345/100 |
| 2013/0082977 A1 | 4/2013 | Noguchi et al. |
| 2014/0313107 A1* | 10/2014 | Lee ....................... G09G 3/3233 |
| | | 345/76 |
| 2016/0071452 A1 | 3/2016 | Nho et al. |
| 2017/0269779 A1 | 9/2017 | Chan et al. |
| 2018/0059864 A1* | 3/2018 | Pham .................... G06F 3/0412 |
| 2018/0321788 A1 | 11/2018 | Kimura et al. |

FOREIGN PATENT DOCUMENTS

JP 2015-2108 11/2015

OTHER PUBLICATIONS

Extended European Search Report issued in European application No. 24162221.6, dated Jul. 10, 2024, 13 pages.

* cited by examiner

*Primary Examiner* — Ryan Crockett (74) *Attorney, Agent, or Firm* — Crowell & Moring LLP (57) ABSTRACT

A metal housing includes a printed circuit board, a display panel with an LCD panel, and an FPC that connects the printed circuit board and the LCD panel. An EH power source and an EL power source on the printed circuit board are used to drive pixel electrodes on the LCD panel. A series LC circuit and capacitors are disposed on the printed circuit board, and one end of the series LC circuit is connected to the ground and the other end is connected to power source wiring via the capacitors. The impedance characteristics of the series LC circuit and the capacitors C4 and C5 are set such that the impedance is sufficiently small in a frequency band of predicted ground noise and large in other frequency bands.

12 Claims, 8 Drawing Sheets

DISPLAY DEVICE

RELATED APPLICATION

The present application claims priority to Japanese Patent Application Number 2023-041638, filed Mar. 16, 2023, the entirety of which is hereby incorporated by reference.

BACKGROUND

1. Field of the Disclosure

The present disclosure relates to noise suppression for display devices that use liquid crystal displays (LCDs), such as in-cell touch panel displays.

2. Description of the Related Art

As a display device using an LCD, an in-cell touch panel display has been used that uses a common electrode also as an electrode for touch detection in an LCD which has pixels arranged therein and which has pixel electrodes to which voltages corresponding to pixel values are applied, the common electrode to which a common voltage is applied, and a liquid crystal sandwiched between the pixel electrodes and the common electrode.

In such an in-cell touch panel display, a technology for stabilizing a drive signal to be applied to the common electrode by applying an AC drive signal applied to the common electrode for touch detection to signal lines of the pixels during the touch detection, thereby reducing an adverse effect of parasitic capacitance between the common electrode and the signal lines of the pixels has been used (for example, JP 2015-210811 A).

A ground of a display device with an LCD may be connected to both a ground line that is connected to a battery and a vehicle body ground.

In general, the display device and the battery are located far apart, and a length of the ground line between the display device and the battery is at least 1 m.

In this case, a portion forming a path extending from the ground line through the display device to the vehicle body ground functions as an antenna, and in relation to the fact that the ground line has high impedance, noise generated by radio waves, etc. at the antenna propagates to the display device as ground noise carrying a relatively large current. The ground noise propagating the display device is large at a resonant frequency of the antenna. This ground noise causes malfunction of the display device.

SUMMARY

Accordingly, it is an object of the present disclosure to suppress malfunction of the display device caused by ground noise.

According to an aspect of the present disclosure, a display device having a liquid crystal display (LCD) panel configured such that common electrodes to which a potential based on a ground level is applied, liquid crystal, and pixel electrodes are stacked, and a display driver for driving the pixel electrodes of the LCD panel includes a power source section configured to supply a power source to be used by the display driver to drive the pixel electrodes, a capacitor having one end connected to wiring of the power source between the power source section and the display device, and an impedance device disposed between the other end of the capacitor and the ground of the display device. Here, the capacitor and the impedance device have such impedance characteristics that a DC component is blocked and impedance in a predetermined frequency band set as a frequency band in which ground noise is generated is reduced is reduced.

According to another aspect of the present disclosure, a display device having an in-cell LCD panel configured such that common electrodes to which a potential based on a ground level is applied, liquid crystal, and pixel electrodes are stacked, a display driver that drives pixel electrodes of the LCD panel, and a touch panel controller that detects a touch by applying an AC signal to the common electrodes of the LCD panel includes a power source section configured to supply a power source to be used by the display driver to drive the pixel electrodes, a first capacitor, a second capacitor, and an impedance device. Here, each of the first capacitor and the second capacitor is connected at one end to AC signal wiring, which is wiring to which the AC signal is applied from the touch panel controller, and at the other end to power source wiring, which is wiring for the power source between the power source section and the display driver. Furthermore, the impedance device has one end connected to AC signal wiring and the other end connected to the ground of the display device. The AC signal is superimposed on the power source via the first capacitor. The second capacitor and the impedance device have such impedance characteristics that a DC component is blocked and impedance in a frequency band of the AC signal is increased and impedance in a predetermined frequency band set as a frequency band where ground noise is generated is reduced.

According to a further aspect of the present disclosure, a display device having an in-cell LCD panel configured such that common electrodes to which a potential based on a ground level is applied, liquid crystal, and pixel electrodes are stacked, a display driver that drives pixel electrodes of the LCD panel, and a touch panel controller that detects a touch by applying an AC signal to the common electrodes of the LCD panel. Here, the LCD panel includes TFTs having drains connected to the respective pixel electrodes, sources to which source voltages corresponding to pixel values are applied from the display driver, and gates to which gate voltages are applied by the display driver, the TFTs being controlled to be turned on or off by the gate voltages. Furthermore, the display device includes a first power source section supplying a first power source which is a power source of a voltage to be used as a gate voltage when the display driver turns on the TFTs connected to the pixel electrodes, a second power source section supplying a second power source which is a power source of a voltage to be used as a gate voltage when the display driver turns off the TFTs connected to the pixel electrodes, a first capacitor, a second capacitor, a third capacitor, a fourth capacitor, and an impedance device. Each of the first capacitor and the second capacitor is connected at one end to AC signal wiring, which is wiring to which the AC signal is applied from the touch panel controller, and at the other end to first power source wiring, which is wiring for the first power source between the first power source section and the display driver. Each of the third capacitor and the fourth capacitor is connected at one end to the AC signal wiring and at the other end to second power source wiring, which is wiring for the second power source between the second power source section and the display driver. The impedance device has one end connected to AC signal wiring and the other end connected to the ground of the display device. The AC signal is superimposed on the first power source via the first capacitor and the AC signal is superimposed on the second power source via the third capacitor. The second capacitor, the fourth capacitor, and the impedance device have such impedance characteristics that a DC component is blocked and impedance in a frequency band of the AC signal is increased and impedance in a predetermined frequency band set as a frequency band where ground noise is generated is reduced.

Here, the display device may include a display panel including the LCD panel, the display driver, and the touch panel controller, a substrate having the first power source section, the second power source section, the first capacitor, the second capacitor, the third capacitor, the fourth capacitor, and the impedance device, and a flexible printed circuit (FPC) configured to connect the display panel and the substrate. A portion, between the display panel and the substrate, of the AC signal wiring, the first power source wiring, and the second power source wiring may be formed on the FPC.

In the display device, the impedance device may be a series LC circuit with a coil and a capacitor connected in series.

The display device may be mounted on a vehicle. The ground of the display device may be connected to a battery of the vehicle through a predetermined ground line and to a vehicle body ground of the vehicle by a conductive body different from the ground line. The predetermined frequency band may include a resonant frequency of an antenna having a length corresponding to a length of a path between the battery and the vehicle body ground via the ground of the display device.

According to the display devices, a magnitude of ground noise propagating to the pixel electrodes may be increased, and variation in a voltage difference due to the ground noise between the pixel electrodes and the common electrodes where the ground noise appears large due to control by a potential based on the ground level may be reduced to suppress malfunction of the display device.

DETAILED DESCRIPTION

Hereinafter, a display device according to an embodiment of the present disclosure will be described.

First, a background of a display device according to this embodiment will be described.

Figure 1A:
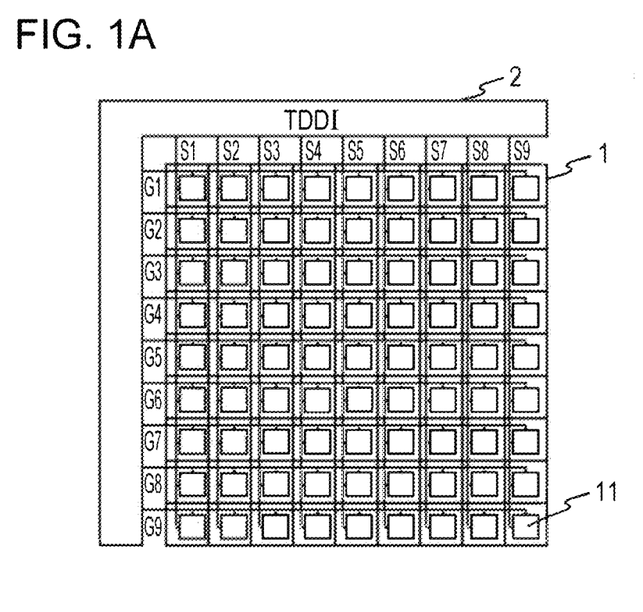
FIGS. 1A to 1C are diagrams illustrating a basic configuration of an in-cell touch panel display.
Figure 1B:
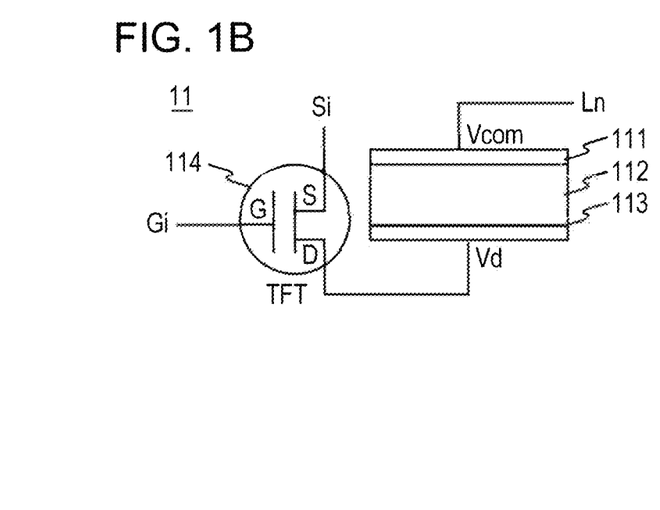
Figure 1C:
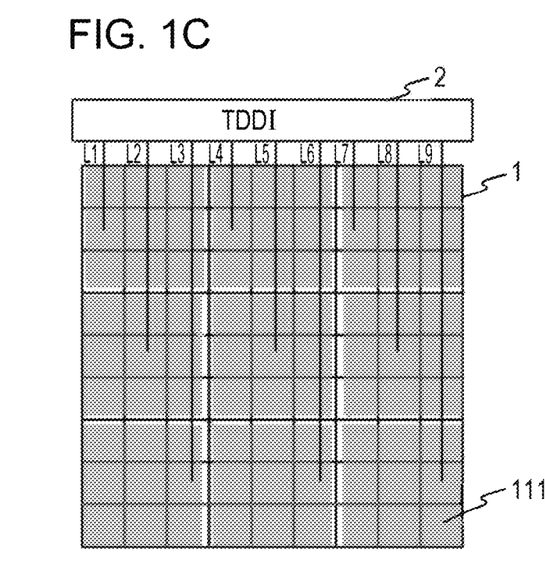

A basic configuration of an in-cell touch panel display is illustrated in FIGS. 1A to 1C.

As illustrated in FIG. 1A, an in-cell touch panel display has an in-cell LCD panel 1 and a touch display driver integration (TDDI) 2 having a function of a touch panel controller and a function of a display driver.

The LCD panel 1 has a plurality of pixels 11 arranged in a matrix of n rows and m columns. The individual pixels 11 in an i-th row and the TDDI 2 are connected by a selection signal Gi, and the individual pixels 11 in a j-th column and the TDDI 2 are connected by a data signal Sj.

Each of the pixels 11 has a transparent common electrode 111, liquid crystal 112, a pixel electrode 113, and a thin film transistor (TFT) 114, as illustrated in FIG. 1B. The common electrode 111, the liquid crystal 112, and the pixel electrode 113 are stacked in this order, with the common electrode 111 being on a display direction side.

In the pixel 11 arranged in the i-th row and the j-th column, the selection signal Gi is connected to a gate G of the TFT 114, the data signal Sj is connected to a source S of the TFT 114, and the pixel electrode 113 is connected to a drain D of the TFT 114.

Here, as illustrated in FIG. 1C, each common electrode 111 including a number of the pixels 11 is common in an area including the pixels 11. The common electrode 111 and the TDDI 2 in an area k are connected by a touch-scan signal Lk.

Although not illustrated, the LCD panel 1 further includes other devices required for display, such as a backlight.

Figure 2A:
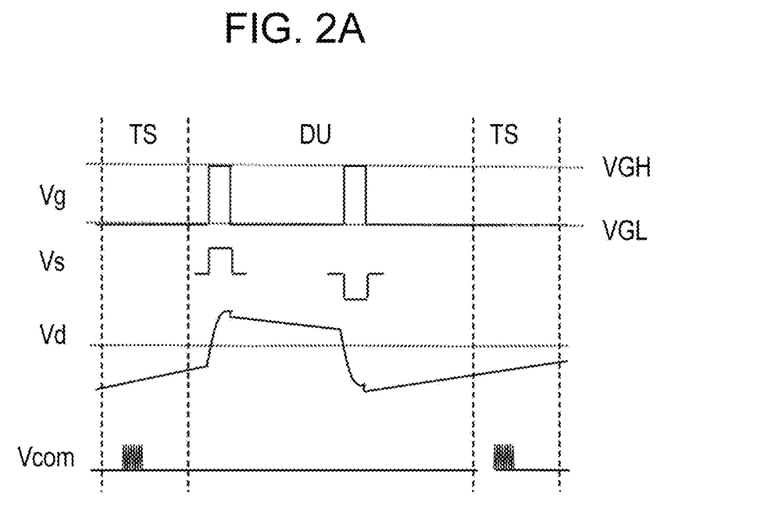
FIGS. 2A and 2B are diagrams illustrating signal waveforms of an in-cell touch panel display that serves as a background of an embodiment of the present disclosure.

Here, in FIG. 2A, a basic driving method of the LCD panel 1, focusing on one of the pixels 11, is illustrated.

As illustrated in FIG. 2A, the TDDI 2 alternately sets a display drive period DU for updating display of the LCD panel 1 and a touch sensing period TS for detecting a touch. Then, in the display drive period DU, the pixels 11 (all the pixels) for one frame are updated.

The TDDI 2 operates with a ground voltage as a reference voltage. In each display drive period DU, the TDDI 2 applies in common a voltage equivalent to the ground voltage to the common electrodes 111 in all areas as a common voltage Vcom, which is a voltage of the common electrodes 111.

The TDDI 2 also changes a gate voltage Vg, which is a voltage of the gate G of the TFT 114 of the pixel 11, via the selection signal Gi connected to the pixel 11, twice in the display drive period DU, from a voltage VGL at which the TFT 114 is off to a voltage VGH at which the TFT 114 is on.

In the two periods when the gate voltage VG is VGH and the TFT114 is on, a voltage with a magnitude corresponding to a pixel value is applied with reverse polarity as a source voltage Vs, which is a voltage at the source S of the TFT114 via the data signal Sj connected to the pixel 11.

When the TFT114 is on, the source voltage Vs of the source S of the TFT114 is applied from the drain D of the TFT114 to the pixel electrode 113, and a charge corresponding to a difference between the common voltage Vcom of the common electrodes 111 and the voltage Vd of the pixel electrodes 113 is applied to the liquid crystal 112, which is also a capacitor, and the voltage Vd of the pixel electrode 113 changes to a voltage corresponding to the pixel value. The voltage Vd of the pixel electrode 113 is then held, discharging little by little, until the next time the voltage VGH that turns on the TFT 114 is applied to the gate G.

On the other hand, in each touch sensing period TS, the TDDI 2 electrically separates the common electrodes 111 in individual areas.

Then, a touch-scan pulse TSP, which is a pulsed AC signal that varies slightly from the ground voltage, is applied to the touch scan signals Lk connected to the individual common electrodes 111 to observe voltage variation of the common electrodes 111, and presence or absence of a touch on the areas corresponding to the common electrodes 111 is detected in accordance with a degree of the voltage variation observed.

According to the driving method of FIG. 2A, depending on a magnitude of the parasitic capacitance between the common electrode 111 and a portion nearer to the pixel 11 than the common electrode 111, the touch-scan pulse TSP may not be stably applied or a touch may not be accurately detected due to an adverse effect of the parasitic capacitance.

Figure 2B:
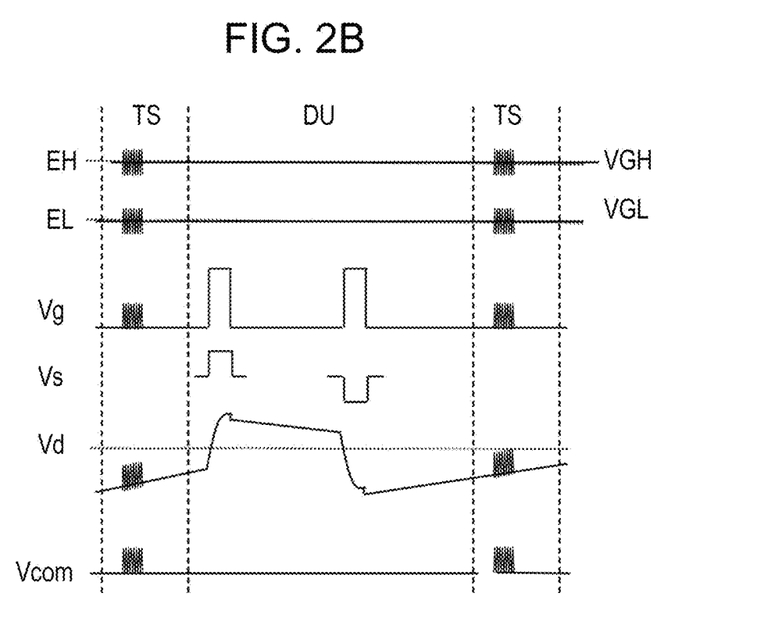

Therefore, it is conceivable to drive the LCD panel 1 using the driving method illustrated in FIG. 2B.

In the driving method illustrated in FIG. 2B, when the touch-scan pulse TSP is applied to the common electrodes 111, a signal equivalent to the touch-scan pulse TSP is applied to the pixel electrodes 113 of the pixels 11, and the common voltage Vcom of the common electrodes 111 and the voltage Vd of the pixel electrodes 113 are varied in the same way, thereby eliminating or reducing an adverse effect of the parasitic capacitance.

In this driving method, the variation of the voltage Vd of the pixel electrodes 113 is achieved by varying the voltage of the power source supplied to the TDDI 2 as well as the touch-scan pulse TSP.

Specifically, as the TDDI 2, a power source EH of the voltage used as VGH and a power source EL of the voltage used as VGL are received from the power source device, and each signal to be output to the LCD panel 1 is generated using the power supplied by the power source device. Then, as illustrated in FIG. 2B, by varying voltages of the power source EH and the power source EL in the same way as the touch-scan pulse TSP when the touch-scan pulse TSP is applied, the voltage Vcom of the common electrodes 111 and the voltage Vd of the pixel electrodes 113 are varied in the same way as the touch scan pulse TSP through the gate voltage Vg of the TFT 114 and the parasitic capacitance of the TFT 114, etc.

Figure 3A:
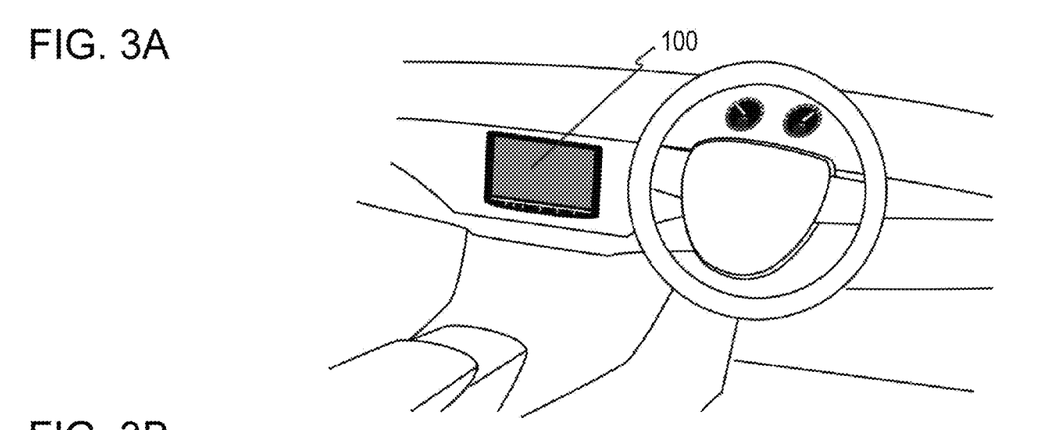
FIGS. 3A to 3C are diagrams illustrating a display device that serves as a background of an embodiment of the present disclosure.
Figure 4:
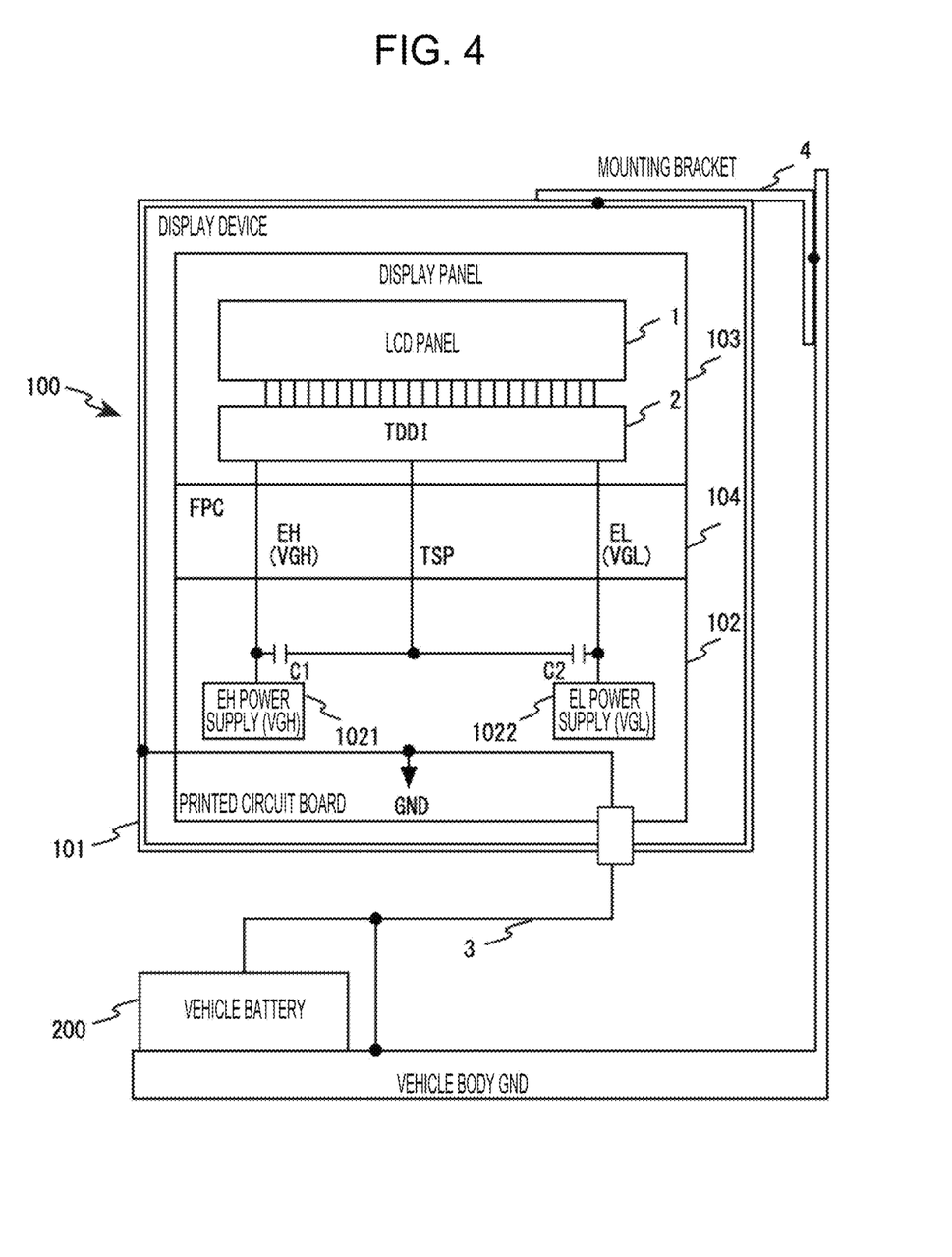
FIG. 4 is a diagram illustrating an example of arrangement of the display device that serves as a background of an embodiment of the present disclosure.

However, this approach creates a problem when the display device 100, which is positioned as illustrated in FIG. 3A on a dashboard of an automobile or the like, is configured with the LCD panel 1 and the power source device separated as illustrated in FIG. 4.

Figure 3B:
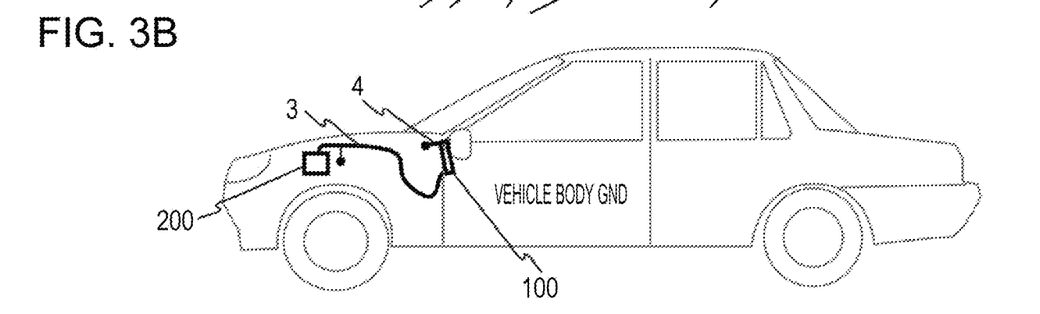

The ground of the display device 100 illustrated in FIG. 3A is connected to a negative terminal of the battery 200 installed in an engine room by a ground line 3, which is formed as a harness as illustrated in FIGS. 3B and 4, as well as to the vehicle body ground at a location near the display device 100 by a metal mounting bracket 4. Note that the negative terminal of the battery 200 is generally connected to the vehicle body ground at a location near the battery 200.

Figure 3C:
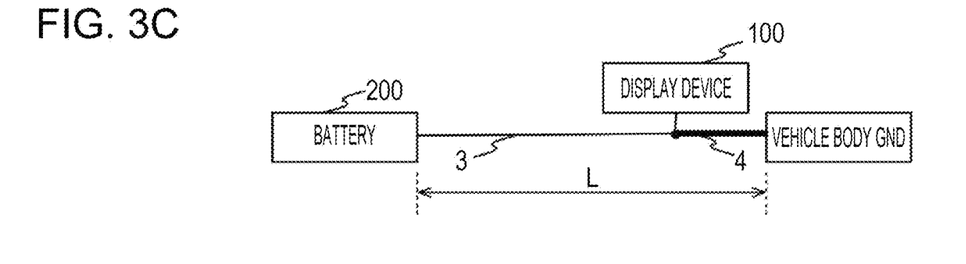

In this case, a portion corresponding to a path from the ground line 3 via the display device 100 to the mounting bracket 4 illustrated in FIG. 3C functions as an antenna, and a resonant frequency of the antenna, determined by a length L of this portion, is roughly in a range of 70 MHz to 30 MHz with a length L of 1 m to 4 m.

Next, the display device 100 illustrated in FIG. 4 is configured such that a metal housing 101 accommodates the printed circuit board (PCB) 102, the display panel 103 with the LCD panel 1 and the TDDI 2, and a flexible printed circuit (FPC) 104 connecting the printed circuit board 102 and the display panel 103. Here, the ground of the printed circuit board 102 is connected to the housing 101, and the ground line 3 and the ground of the display device 100 are connected to the vehicle body ground via the housing 101 and the mounting bracket 4.

The display device 100 further includes the EH power source 1021 and the EL power source 1022 on the printed circuit board 102. The EH power source 1021 supplies the power source EH of a voltage used by the TDDI 2 as VGH to the LCD panel 1 via the FPC 104, and the EL power source 1022 supplies the power source EL of a voltage used as VGL to the LCD panel 1 via the FPC 104.

Then, the touch-scan pulse TSP is output from the TDDI 2 to the printed circuit board 102, and on the printed circuit board 102, an AC component of the touch-scan pulse TSP is superimposed on the power source EH via a capacitor C1, and the AC component of the touch-scan pulse TSP is superimposed on the power source EL via a capacitor C2, so that voltages of the power source EH and the power source EL are varied in the same manner as the touch-scan pulse TSP when the touch-scan pulse TSP is applied.

Since the antenna is formed by the portion corresponding to the path from the ground line 3 via the display device 100 to the mounting bracket 4 as described above, significant ground noise is generated at the resonant frequency of the antenna in the ground of the printed circuit board 102 which is connected to the ground line 3.

This ground noise then propagates to the FPC 104 and the ground of the LCD panel 1. Furthermore, this ground noise jumps (is induced) as noise to wiring of the power source EH, the power source EL, and the touch-scan pulse TSP, which are generally wired close to the ground.

Here, the wiring of the power source EH, the power source EL, and the touch-scan pulse TSP generally has high impedance and connects between the LCD panel 1 and the PCB 102 via the FPC 104, which is long. Therefore, the noise is easily induced (jumped) from the ground to the wiring of the power source EH, the power source EL, and the touch-scan pulse TSP. Note that, when the FPC 104 is made of two layers and one of the layers is a full ground layer, noise will be induced in the wiring of the power source EH, the power source EL, and the touch-scan pulse TSP in the FPC 104 as well.

Figure 5:
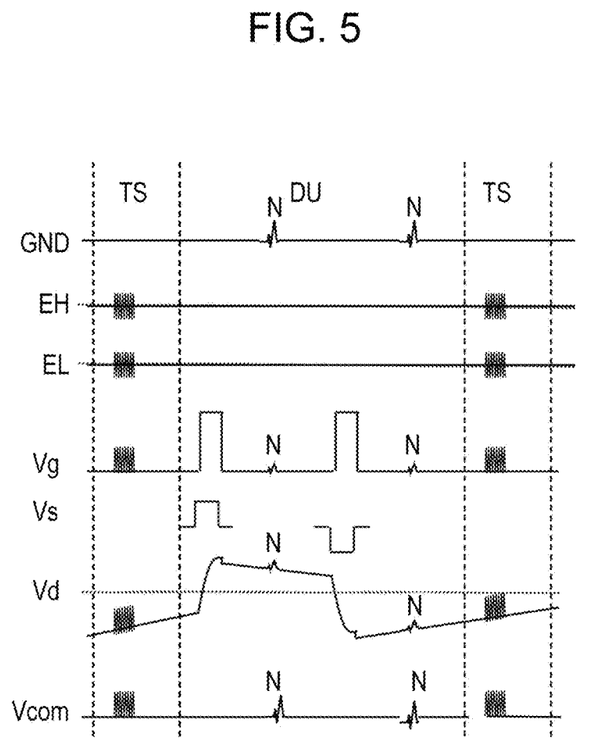
FIG. 5 is a diagram illustrating signal waveforms of the display device that serves as a background of an embodiment of the present disclosure.

Therefore, as illustrated in FIG. 5 with signs N, noise appears in the ground voltage GND and the common voltage Vcom of the common electrode 111, which is equivalent to the ground voltage GND during the period when the touch-scan pulse TSP is not output, and in addition, noise appears in the voltage Vd of the pixel electrodes 113 via the gate voltage VG of the gates G of the TFTs 114 of the pixels 11 of the LCD panel 1 due to noise in the power source EH and the power source EL.

When a magnitude of the noise appearing in the common voltage Vcom of the common electrodes 111 is denoted by ANcom and a magnitude of the noise appearing in the voltage Vd of the pixel electrodes 113 is denoted by ANd, noise of the common electrodes 111 is equivalent to the ground noise appearing in the ground of the display device 100, while the noise of the pixel electrodes 113 is the noise induced from the ground and attenuated by the ground noise, and therefore, "ANcom>ANd" is satisfied.

Therefore, "ANcom−ANd>0" is satisfied and the ground noise may cause a voltage difference variation ANcom−ANd between the common electrodes 111 and the pixel electrodes 113 on the opposite sides of the liquid crystal 112, resulting in a display error.

In the following, the display device 100 of this embodiment will be described with this background in mind.

Figure 6:
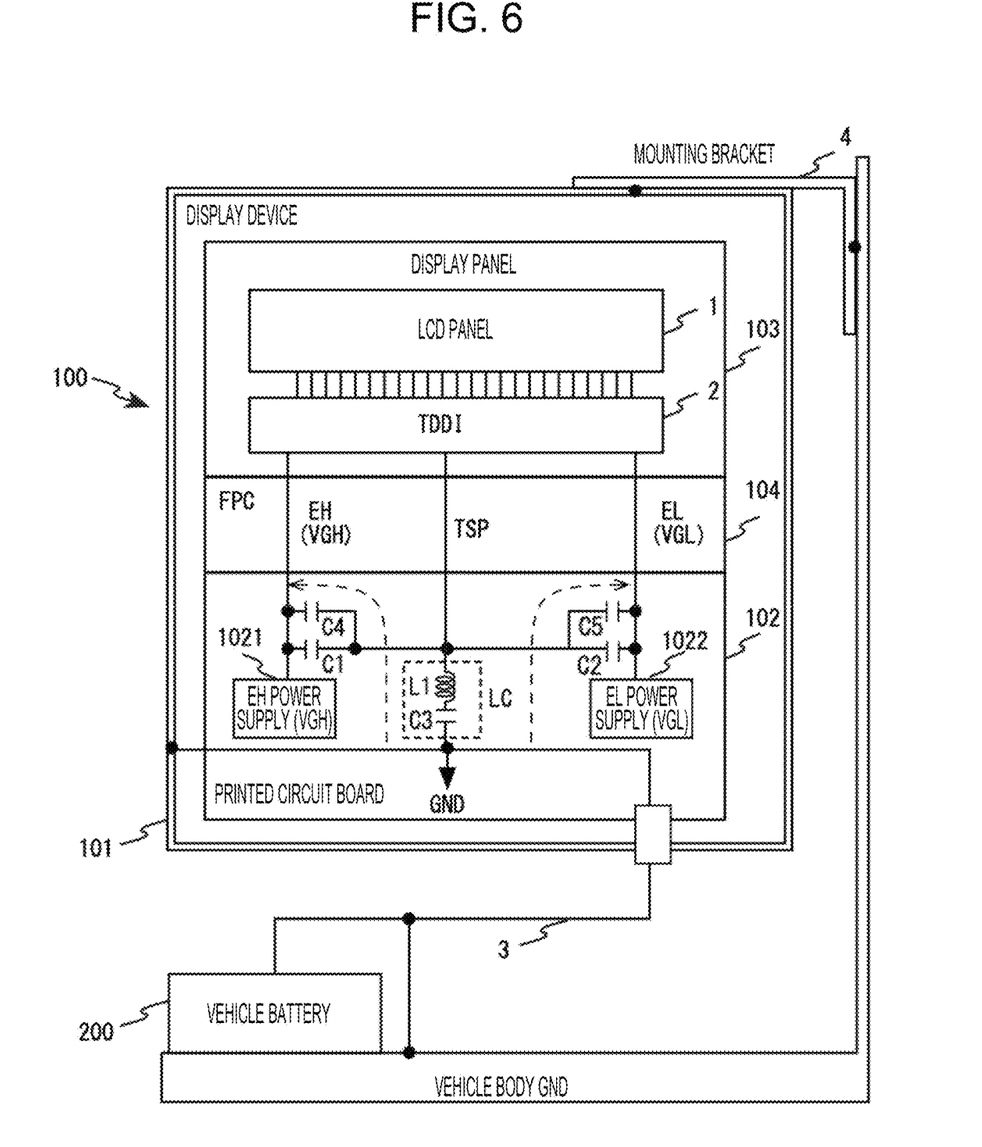
FIG. 6 is a diagram illustrating a configuration of a display device according to an embodiment of the present disclosure.

FIG. 6 is a diagram illustrating a configuration of the display device 100 according to this embodiment.

As illustrated in FIG. 6, the display device 100 of this embodiment is configured such that a series LC circuit including a coil L1 and a capacitor C3 connected in series, a capacitor C4, and a capacitor C5 are added to the printed circuit board 102 as ground noise suppression components in the configuration of the display device 100 illustrated in FIG. 4.

The series LC circuit is disposed between the wiring of the touch-scan pulse TSP and the ground of the printed circuit board 102. The capacitor C4 is disposed in parallel with the capacitor C1 between the wiring of the touch-scan pulse TSP and the wiring of the power source EH, and the capacitor C5 is disposed in parallel with the capacitor C2 between the wiring of touch-scan pulse TSP and the wiring of the power source EL.

The series LC circuit is a resonant circuit and functions as a filter with minimum impedance and maximum transmission at its resonant frequency. The impedance characteristics of the series LC circuit are set such that the impedance is sufficiently small in a range of the resonant frequency of the antenna formed by the portion corresponding to the path from the ground line 3 via the display device 100 to the mounting bracket 4 described above and its surrounding frequency range, and sufficiently large in a frequency of the touch-scan pulse TSP and its surrounding frequency range.

Similarly, the impedance characteristics of the capacitors C4 and C5 are set such that the impedance is sufficiently small in the range of the resonant frequency of the antenna and its surrounding frequency range, and sufficiently large in the frequency of the touch-scan pulse TSP and its surrounding frequency range.

Figure 7A:
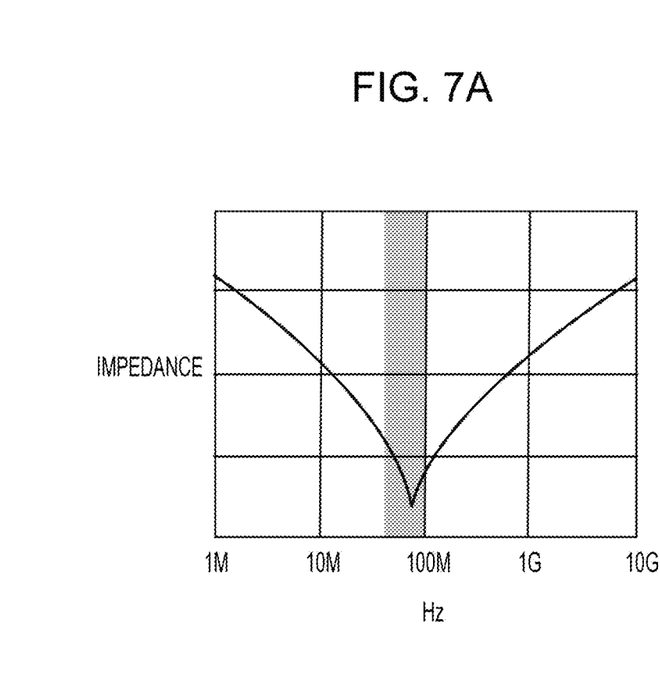
FIGS. 7A and 7B are graphs of examples of characteristics of a ground noise suppression component to be installed in an embodiment of the present disclosure.

For example, when the resonant frequency of the antenna is in a range from 30 MHz to 70 MHz and the frequency of the touch-scan pulse TSP is 50 KHz, as illustrated in FIG. 7A, the impedance is sufficiently small in the range from 30 MHz to 70 MHz and its surrounding range (the range shown in gray) and sufficiently large in a range around the frequency of 50 KHz of the touch-scan pulse TSP.

Figure 7B:
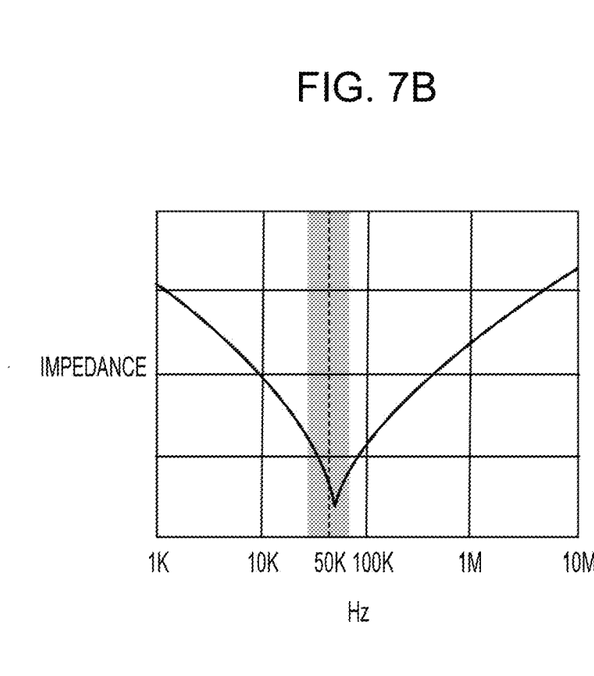

Note that, as illustrated in FIG. 7B, the impedance characteristics of the capacitors C1 and C2 for superimposing the touch-scan pulse TSP on the power sources EH and EL are set such that the impedance is sufficiently small in a range including periphery of the frequency of 50 KHz of the touch-scan pulse TSP (the range shown in gray) and large in other ranges.

By installing these ground noise suppression components, ground noise in the range of the resonant frequency of the antenna propagates from the ground of the printed circuit board 102 through the series LC circuit to the wiring of the touch-scan pulse TSP, and in addition, the ground noise propagating to the wiring is further propagates through the capacitors C4 and C5 to the power sources EH and EL as denoted by dashed arrows in FIG. 6.

Figure 8:
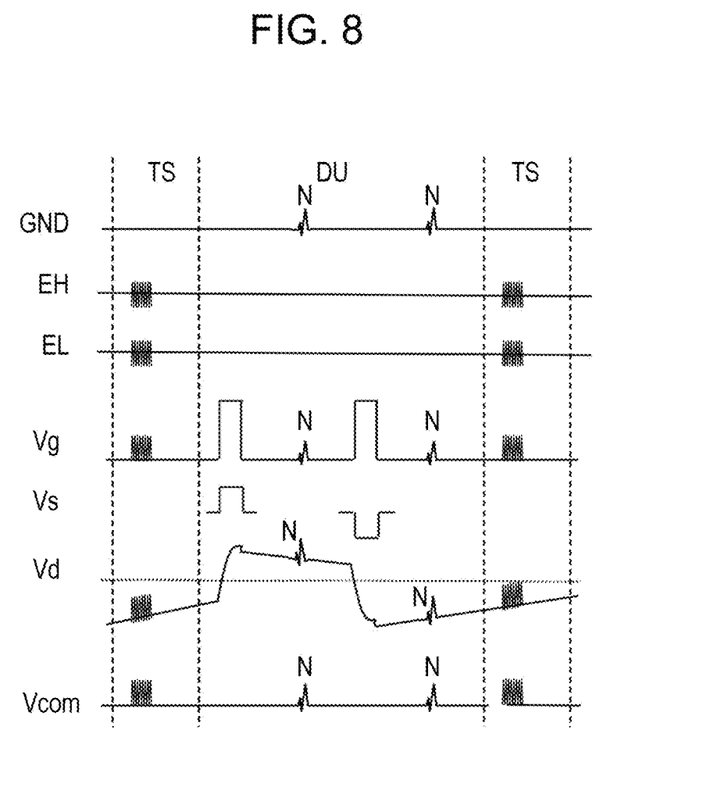
FIG. 8 is a diagram illustrating signal waveforms of the display device according to an embodiment of the present disclosure.

As a result, as illustrated in FIG. 8, the noise that appears in the voltage Vd of the pixel electrodes 113 is obtained by adding noise that appears in the voltage Vd of the pixel electrodes 113 via the gate voltage VG, etc. due to the noise propagated to the power sources EH and EL by the ground noise suppression components to the noise that appears when the ground noise suppression components shown in FIG. 5 are not installed. The noise is larger than that obtained without the ground noise suppression components.

Therefore, when the magnitude of the noise appearing in the common voltage Vcom of the common electrode 111 is denoted by ANcom and the magnitude of the noise appearing in the voltage Vd of the pixel electrodes 113 is denoted by ANd, ANd is closer to ANcom than a case where no ground noise suppression component is installed, and a voltage difference variation ANcom-ANd between the common electrodes 111 and the pixel electrodes 113 on the opposite sides of the liquid crystal 112 caused by the ground noise is smaller than that obtained without the ground noise suppression component.

Furthermore, since the ground noise suppression components appropriately set a gain of the ground noise propagating to the power sources EH and EL, the voltage difference variation ANcom-ANd between the common electrodes 111 and the pixel electrodes 113 on the opposite sides of the liquid crystal 112 caused by the ground noise may be approximately zero.

Since the ground noise suppression components are disposed as described above, it is possible to suppress the occurrence of display errors caused by variation in the voltage difference between the common electrodes 111 and the pixel electrodes 113 on the opposite sides of the liquid crystal 112 caused by the ground noise.

An embodiment of the present disclosure has been described hereinabove.

Here, the foregoing embodiment may be similarly applied to a case where the touch-scan pulse TSP is not superimposed on the power sources EH and EL on the printed circuit board 102. Specifically, in this case, the series LC circuit is connected to the power source EH via the capacitor C4 without the capacitors C1 and C2, and the series LC circuit is connected to the power source EL via the capacitor C4.

In this way, the variation in the voltage difference between the common electrodes 111 and the pixel electrodes 113 on the opposite sides of the liquid crystal 112 caused by the ground noise may be expected to be suppressed, and the occurrence of display errors may be expected to be suppressed.

It is to be understood that the embodiments and the examples are illustrative only in implementing the present disclosure and should not be construed as limiting the technical scope of the present disclosure. In other words, various changes and modifications of the present disclosure may be made without departing from the spirit and scope thereof.

The invention claimed is:

1. A display device including a liquid crystal display (LCD) panel configured such that common electrodes to which a potential based on a ground level is applied, liquid crystal, and pixel electrodes are stacked, and a display driver for driving the pixel electrodes of the LCD panel, the display device comprising:
   a power source section configured to supply a power source used by the display driver to drive the pixel electrodes;
   a capacitor having one end connected to wiring of the power source between the power source section and the display device; and
   an impedance device disposed between the other end of the capacitor and the ground of the display device;
   wherein the capacitor and the impedance device have such impedance characteristics that a DC component is blocked and impedance in a predetermined frequency band set as a frequency band in which ground noise is generated is reduced.

2. The display device according to claim 1, wherein:
   the impedance device is a series LC circuit with a coil and a capacitor connected in series.

3. The display device according to claim 1, wherein:
the display device is mounted on a vehicle;
the ground of the display device is connected to a battery of the vehicle through a predetermined ground line and to a vehicle body ground of the vehicle by a conductive body different from the ground line; and
the predetermined frequency band includes a resonant frequency of an antenna having a length corresponding to a length of a path between the battery and the vehicle body ground via the ground of the display device.

4. A display device including an in-cell LCD panel configured such that common electrodes to which a potential based on a ground level is applied, liquid crystal, and pixel electrodes are stacked, a display driver that drives the pixel electrodes of the LCD panel, and a touch panel controller that detects a touch by applying an AC signal to the common electrodes of the LCD panel, the display device comprising:
a power source section configured to supply a power source to be used by the display driver to drive the pixel electrodes;
a first capacitor;
a second capacitor; and
an impedance device;
wherein:
each of the first capacitor and the second capacitor is connected at one end to AC signal wiring, which is wiring to which the AC signal is applied from the touch panel controller, and at the other end to power source wiring, which is wiring for the power source between the power source section and the display driver;
the impedance device has one end connected to AC signal wiring and the other end connected to the ground of the display device;
the AC signal is superimposed on the power source via the first capacitor; and
the second capacitor and the impedance device have such impedance characteristics that a DC component is blocked and impedance in a frequency band of the AC signal is increased and impedance in a predetermined frequency band set as a frequency band where ground noise is generated is reduced.

5. The display device according to claim 4, wherein:
the impedance device is a series LC circuit with a coil and a capacitor connected in series.

6. The display device according to claim 4, wherein:
the display device is mounted on a vehicle;
the ground of the display device is connected to a battery of the vehicle through a predetermined ground line and to a vehicle body ground of the vehicle by a conductive body different from the ground line; and
the predetermined frequency band includes a resonant frequency of an antenna having a length corresponding to a length of a path between the battery and the vehicle body ground via the ground of the display device.

7. A display device including an in-cell LCD panel configured such that common electrodes to which a potential based on a ground level is applied, liquid crystal, and pixel electrodes are stacked, a display driver that drives the pixel electrodes of the LCD panel, and a touch panel controller that detects a touch by applying an AC signal to the common electrodes of the LCD panel, wherein:
the LCD panel includes TFTs having drains connected to the pixel electrodes, sources to which source voltages corresponding to pixel values are applied from the display driver, and gates to which gate voltages are applied by the display driver, the TFTs being controlled to be turned on or off by the gate voltages:
the display device includes:
a first power source section configured to supply a first power source of a voltage used as a gate voltage when the display driver turns on the TFTs connected to the pixel electrodes;
a second power source section configured to supply a second power source which is a power source of a voltage to be used as a gate voltage when the display driver turns off the TFTs connected to the pixel electrodes;
a first capacitor;
a second capacitor;
a third capacitor;
a fourth capacitor; and
an impedance device;
wherein:
each of the first capacitor and the second capacitor is connected at one end to AC signal wiring, which is wiring to which the AC signal is applied from the touch panel controller, and at the other end to first power source wiring, which is wiring for the first power source between the first power source section and the display driver;
each of the third capacitor and the fourth capacitor is connected at one end to the AC signal wiring and at the other end to second power source wiring, which is wiring for the second power source between the second power source section and the display driver;
the impedance device has one end connected to AC signal wiring and the other end connected to the ground of the display device;
the AC signal is superimposed on the first power source via the first capacitor and the AC signal is superimposed on the second power source via the third capacitor; and
the second capacitor, the fourth capacitor, and the impedance device have such impedance characteristics that a DC component is blocked and impedance in a frequency band of the AC signal is increased and impedance in a predetermined frequency band set as a frequency band where ground noise is generated is reduced.

8. The display device according to claim 7, comprising:
a display panel including the LCD panel, the display driver, and the touch panel controller;
a substrate having the first power source section, the second power source section, the first capacitor, the second capacitor, the third capacitor, the fourth capacitor, and the impedance device; and
a flexible printed circuit (FPC) configured to connect the display panel and the substrate;
wherein a portion, between the display panel and the substrate, of the AC signal wiring, the first power source wiring, and the second power source wiring is formed on the FPC.

9. The display device according to claim 8, wherein:
the impedance device is a series LC circuit with a coil and a capacitor connected in series.

10. The display device according to claim 8, wherein:
the display device is mounted on a vehicle;
the ground of the display device is connected to a battery of the vehicle through a predetermined ground line and to a vehicle body ground of the vehicle by a conductive body different from the ground line; and the predetermined frequency band includes a resonant frequency of an antenna having a length corresponding to a length of a path between the battery and the vehicle body ground via the ground of the display device.

11. The display device according to claim 7, wherein:
the impedance device is a series LC circuit with a coil and a capacitor connected in series.

12. The display device according to claim 7, wherein:
the display device is mounted on a vehicle;
the ground of the display device is connected to a battery of the vehicle through a predetermined ground line and to a vehicle body ground of the vehicle by a conductive body different from the ground line; and
the predetermined frequency band includes a resonant frequency of an antenna having a length corresponding to a length of a path between the battery and the vehicle body ground via the ground of the display device.

* * * * *